United States Patent [19]
Aoshima

[11] Patent Number: 5,925,945
[45] Date of Patent: Jul. 20, 1999

[54] COMPACT MOTOR WITH ENHANCED WORKABILITY

[75] Inventor: Chikara Aoshima, Zama, Japan

[73] Assignee: Canon Kabushiki Kaisha, Tokyo, Japan

[21] Appl. No.: 08/994,994

[22] Filed: Dec. 19, 1997

[30] Foreign Application Priority Data

Dec. 27, 1996 [JP] Japan .................................. 8-358029
Jan. 30, 1997 [JP] Japan .................................. 9-031191

[51] Int. Cl.$^6$ ................................................ H02K 37/10
[52] U.S. Cl. ............................... 310/49 R; 310/40 MM
[58] Field of Search .............................. 310/49 R, 156, 310/114, 51, 164, 40 MM, 257

[56] References Cited

U.S. PATENT DOCUMENTS

| | | | |
|---|---|---|---|
| 3,479,539 | 11/1969 | Brion ..................................... | 310/49 R |
| 4,296,341 | 10/1981 | Guttinger ................................. | 310/41 |
| 4,823,038 | 4/1989 | Mizutani et al. ....................... | 310/156 |
| 4,987,329 | 1/1991 | Schmidt et al. ........................ | 310/156 |
| 5,384,506 | 1/1995 | Aoshima ................................. | 310/49 R |
| 5,410,200 | 4/1995 | Sakamoto et al. ..................... | 310/49 R |
| 5,523,634 | 6/1996 | Takahashi et al. ..................... | 310/49 |
| 5,628,047 | 5/1997 | Hiroyoshi ................................. | 419/62 |
| 5,831,356 | 11/1998 | Aoshima ................................. | 310/49 R |

FOREIGN PATENT DOCUMENTS

| | | |
|---|---|---|
| 0 801 459 | 10/1997 | European Pat. Off. . |
| 61-128762 | 6/1986 | Japan . |
| 62-141955 | 5/1987 | Japan . |
| 62-141955 | 6/1987 | Japan . |
| 02 228241 | 11/1990 | Japan . |
| 2-228241 | 11/1990 | Japan . |
| 03 082350 | 4/1991 | Japan . |
| 03 256555 | 11/1991 | Japan . |
| 7256145 | 4/1997 | Japan . |
| 8098881 | 11/1997 | Japan . |

*Primary Examiner*—Nestor Ramirez
*Assistant Examiner*—Joseph Waks
*Attorney, Agent, or Firm*—Fitzpatrick, Cella, Harper & Scinto

[57] ABSTRACT

A motor is formed in such structure that a rotor of permanent magnet, equally divided in the circumferential direction and magnetized in alternately different poles, is formed in a cylindrical shape, that a first coil, the rotor, and a second coil are located in order in the axial direction, that first outside and first inside poles excited by the first coil are opposed to outside and inside peripheral surfaces of the rotor, and that second outside and second inside poles excited by the second coil are opposed to the outside and inside peripheral surfaces of the rotor, wherein yokes forming the first and second inside poles of this motor are formed so that a cross section thereof in a direction perpendicular to the axis of the rotor has alternately formed regions with a large outside dimension and with a small outside dimension, thereby being formed in the shape with good workability. In addition, the working of a yoke for forming the outside poles is also made easy.

12 Claims, 9 Drawing Sheets

COMPACT MOTOR WITH ENHANCED WORKABILITY

BACKGROUND OF THE INVENTION

1. Field of the Invention

The present invention relates to a motor that can be constructed in microstructure with enhanced workability.

2. Related Background Art

Figure 13:
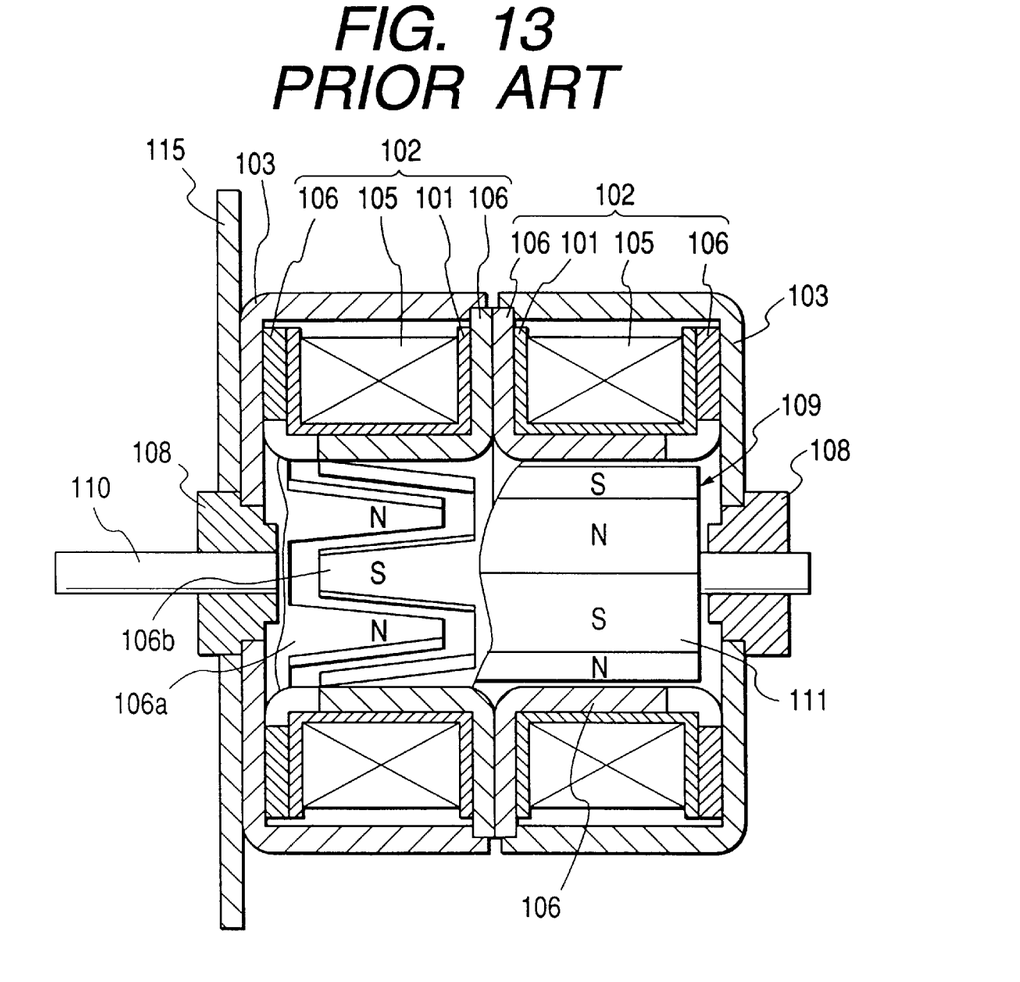
FIG. 13 is a cross-sectional view to show a conventional step motor.

Among conventional compact motors, there is, for example, a compact, cylindrical step motor as shown in FIG. 13. A stator coil 105 is concentrically wound on each of bobbins 101, and each bobbin 101 is fixed as being axially sandwiched between two stator yokes 106. The stator yoke 106 have stator teeth 106a and stator teeth 106b arranged in alternating fashion along the circumferential direction of the bore surface of bobbin 101. The stator yokes 106 integral with the stator teeth 106a or 106b are fixed to cases 103, thus composing stators 102.

Flange 115 and bearing 108 are fixed to one of two sets of cases 103 and another bearing 108 is fixed to the other case 103. Rotor 109 is comprised of a rotor magnet 111 fixed to rotor shaft 110, and the rotor magnet 111 and the stator yoke 106 of stator 102 form radial gap portions. The rotor shaft 110 is rotatably supported between the two bearings 108.

Figure 14:
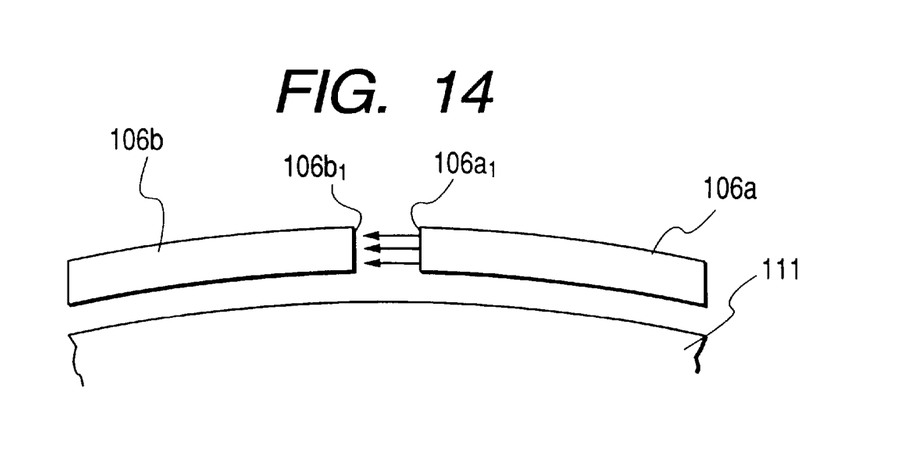
FIG. 14 is an explanatory drawing to show the magnetic flux in the conventional step motor shown in FIG. 13.

The conventional compact step motor described above, however, had the drawback that the outside dimensions of motor were large, because the cases 103, bobbins 101, stator coils 105, stator yokes 106, etc. were concentrically located outside the rotor. In addition, it has another drawback that the output of motor is not high, because the magnetic flux generated by energizing the stator coils 105 mainly passes end faces 106a1 of the stator teeth 106a and end faces 106b1 of the stator teeth 106b, as shown in FIG. 14, and does not effectively act on the rotor magnet 111.

The applicant proposed a motor solving such problems in U.S. patent application Ser. No. 08/831,863 (filed Apr. 2, 1997).

This proposed motor is constructed in such structure that the rotor of permanent magnet partitioned and magnetized in the alternately different poles at equal intervals in the circumferential direction is formed in a cylindrical shape, that a first coil, the rotor, and a second coil are located in order along the axial direction of the rotor, that the first outside pole and first inside pole excited by the first coil are opposed to outside and inside peripheral surfaces of the rotor, and that the second outside pole and second inside pole excited by the second coil are opposed to the outside and inside peripheral surfaces of the rotor.

The motor of this structure was able to provide high output and had small outside dimensions of motor, but the radial dimension of the first inside pole and second inside pole which comprise a pair of magnetic tooth with separated tip ends was also small. When these pole teeth were processed by press working, there were problems of strength of mold, emission of chip, and so on. Therefore, the processing was not easy and it was rather difficult to achieve high strength of the teeth. There were desires for readily processing the first outside pole and second outside pole, too.

SUMMARY OF THE INVENTION

An object of the present invention is to overcome the above drawbacks and to provide a motor that can be constructed in microstructure wherein the inside poles are formed in a shape with high workability.

Another object of the present invention is to provide a motor that can be constructed in microstructure wherein processing of the outside poles is easy.

Other objects of the present invention will become more apparent by specific embodiments which will be described below.

DESCRIPTION OF THE PREFERRED EMBODIMENTS

The embodiments of the present invention will be described by reference to the drawings.

Embodiment 1

FIG. 1 to FIG. 4 are drawings to show Embodiment 1. Reference numeral 1 designates a permanent magnet of a cylindrical shape, which is composed of a first magnetic layer having four portions 1a, 1b, 1c, 1d obtained by quartering the circumference and alternately magnetized in the S and N poles, and a second magnetic layer having four portions 1e, 1f, 1g, 1h obtained similarly by quartering the circumference and alternately magnetized in the S and N poles. The first magnetic layer and the second magnetic layer are magnetized in respective phases shifted by 45° from each other.

Figure 1:
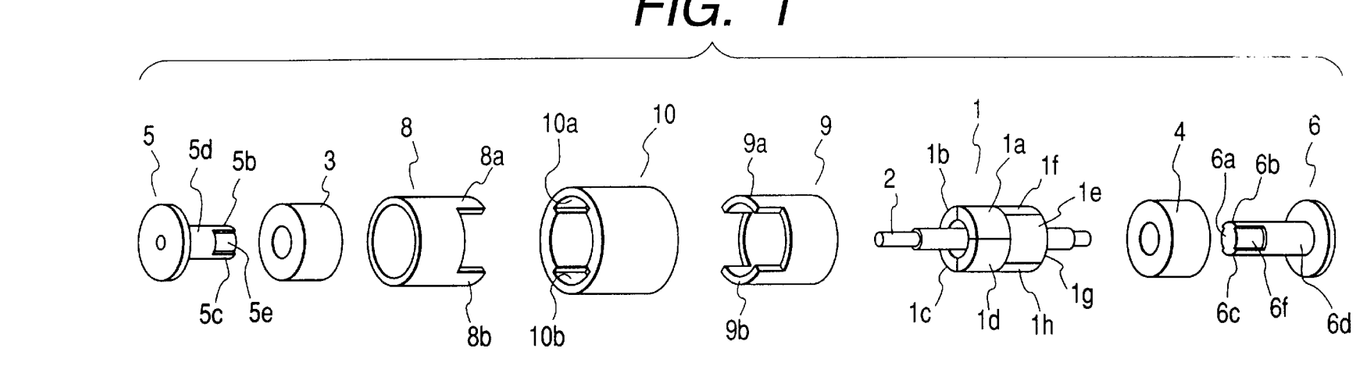
FIG. 1 is an exploded, perspective view of a motor of the first embodiment according to the present invention.

The outside peripheral surfaces of the portions 1a, 1c of the first magnetic layer and the portions 1e, 1g of the second magnetic layer are magnetized in the S pole and the inside peripheral surfaces thereof in the N pole; the outside peripheral surfaces of the portions 1b, 1d of the first magnetic layer and the portions 1f, 1h of the second magnetic layer are magnetized in the N pole and the inside peripheral surfaces thereof in the S pole.

Numeral 2 denotes a rotational shaft, to which the permanent magnet 1 is fixed. The rotational shaft 2 and permanent magnet 1 compose a rotor. Numerals 3, 4 are coils which are located so as to be concentric with the permanent magnet 1 and to sandwich the permanent magnet 1 in the axial direction. Numeral 5 represents a first yoke made of a soft magnetic material, which has a portion 5*d* set in a bore portion 3*a* of the coil 3 and a pole section opposed to a bore portion of the first magnetic layer of the permanent magnet 1.

Figure 4:
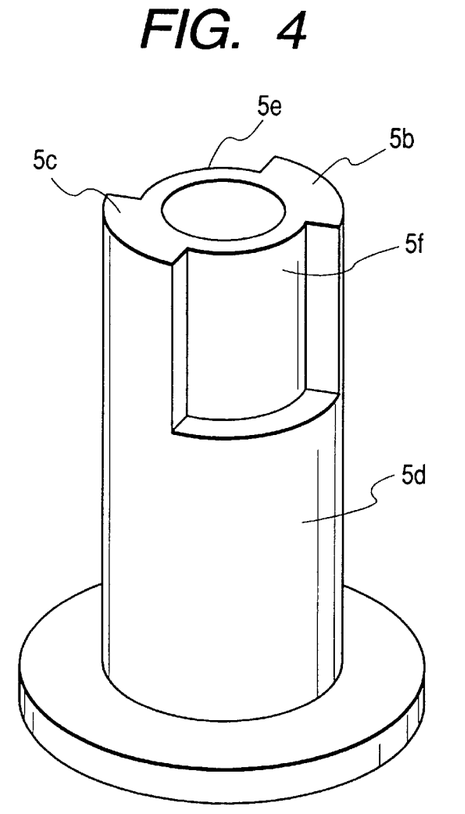
FIG. 4 is an enlarged view of the yoke as an inside pole in the motor shown in FIG. 2.

In the pole section, as shown in FIG. 4, portions 5*b*, 5*c* with a large outside diameter and portions 5*e*, 5*f* with a small outside diameter are alternately formed in the cross section taken in the direction perpendicular to the axis. The portions 5*b*, 5*c* are formed in the same phase, relative to the poles of the first magnetic layer. Namely, the portion 5*b* and the portion 5*c* are located as shifted by 180° from each other. A portion 2*a* of the rotational shaft 2 is fitted in a hole 5*a* of the first yoke so as to be rotatable.

Numeral 6 denotes a second yoke made of a soft magnetic material, which has a portion 6*d* set in a bore portion 4*a* of the coil 4 and a pole section opposed to a bore porion of the second magnetic layer of the permanent magnet 1. In the pole section, portions 6*b*, 6*c* with a large outside diameter and portions 6*e*, 6*f* with a small outside diameter are alternately formed, as in the first yoke 5. The portions 6*b*, 6*c* are formed in the same phase, relative to the poles of the second magnetic layer. Namely, the portion 6*b* and the portion 6*c* are located as shifted by 180° from each other. A portion 2*b* of the rotational shaft 2 is fitted in a hole 6*a* of the second yoke so as to be rotatable. The large diameter portions 5*b*, 5*c* of the first yoke 5 and the large diameter portions 6*b*, 6*c* of the second yoke 6 are located in the same phase, i.e., opposed to each other with respect to the axial direction.

Numeral 8 stands for a third yoke made of a soft magnetic material, in which teeth 8*a*, 8*b* are formed at positions where they sandwich the portions 5*b*, 5*c* of the first yoke 5 and the first magnetic layer of the permanent magnet 1. Numeral 9 stands for a fourth outer yoke made of a soft magnetic material, in which teeth 9*a*, 9*b* are formed at positions where they sandwich the portions 6*b*, 6*c* of the second yoke 6 and the second magnetic layer of the permanent magnet 1.

Numeral 10 designates a coupling ring made of a nonmagnetic material, which has grooves 10*a*, 10*b* engaged with the teeth 8*a*, 8*b* of the third yoke 8 and grooves 10*c*, 10*d* engaged with the teeth 9*a*, 9*b* of the fourth yoke. The third yoke 8 and the fourth yoke 9 are fixed to the coupling ring 10 by a conventional method, for example, by bonding or the like. The third yoke 8 and the fourth yoke 9 are fixed with a predetermined space through portions 10*e*, 10*f* of the coupling ring 10. The teeth 8*a*, 8*b* of the third yoke 8 are so arranged as to face the teeth 9*a*, 9*b* of the fourth yoke 9.

Figure 2:
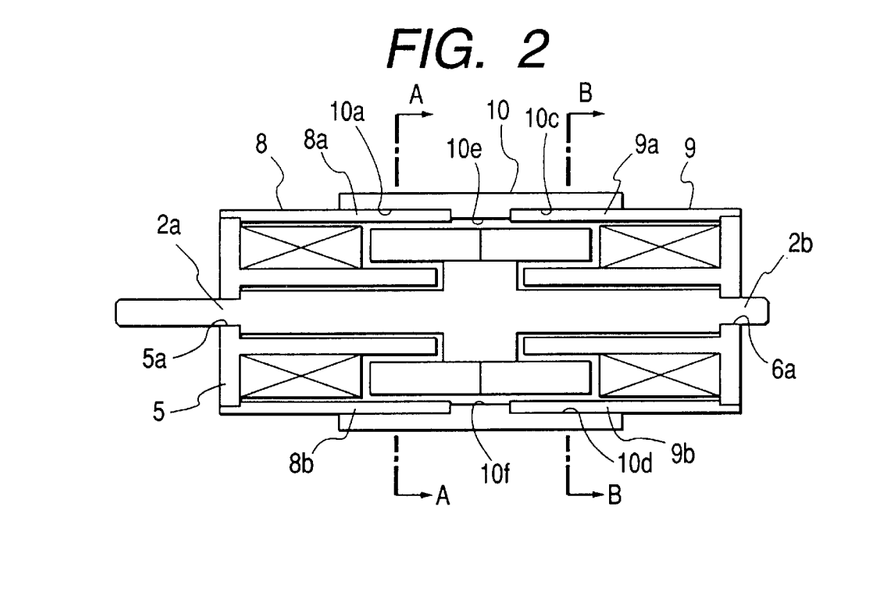
FIG. 2 is a cross-sectional view of the assembled state of the motor shown in FIG. 1.

The third yoke 8 is so arranged, as shown in FIG. 2, that one end thereof is connected to the first yoke 5 and covers the outside-diameter portion of coil 3 and that the teeth 8*a*, 8*b* at the other end are opposed with a predetermined gap to the outside peripheral portion of the permanent magnet 1. The fourth yoke 9 is so arranged, as shown in FIG. 2, that one end thereof is connected to the second yoke 6 and covers the outside-diameter portion of coil 4 and that the teeth 9*a*, 9*b* at the other end are opposed with a predetermined gap to the outside peripheral portion of the permanent magnet 1.

Figure 3A:
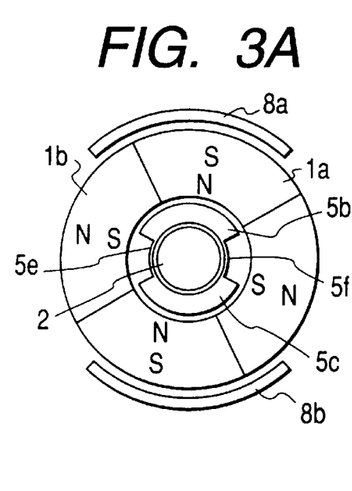
FIGS. 3A, 3B, 3C, 3D, 3E, 3F, 3G, and 3H are drawings for explaining the rotor rotation operation of the motor shown in FIG. 2.
Figure 3B:
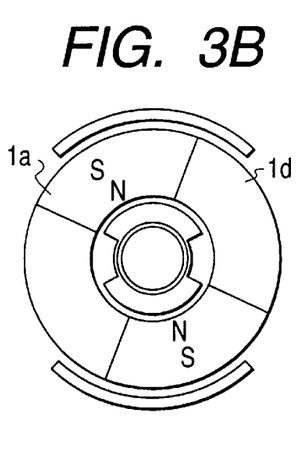
Figure 3C:
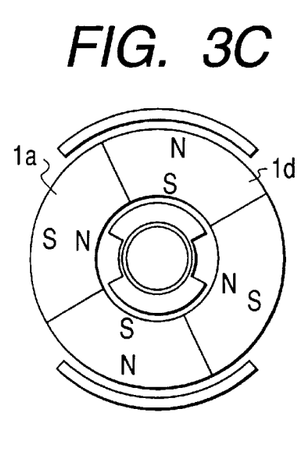
Figure 3D:
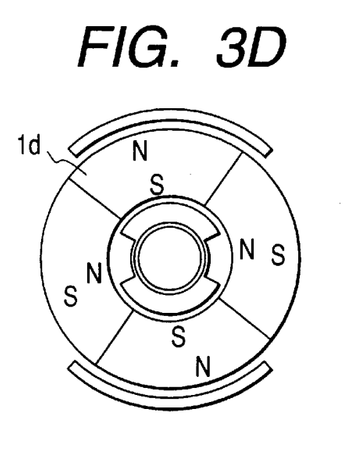
Figure 3E:
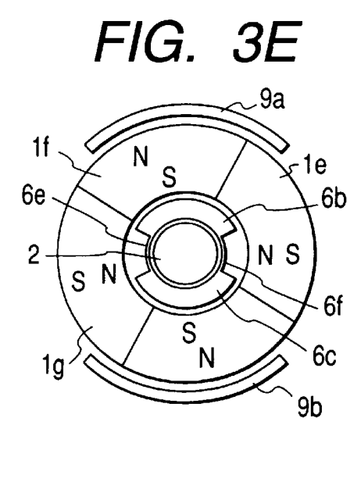
Figure 3F:
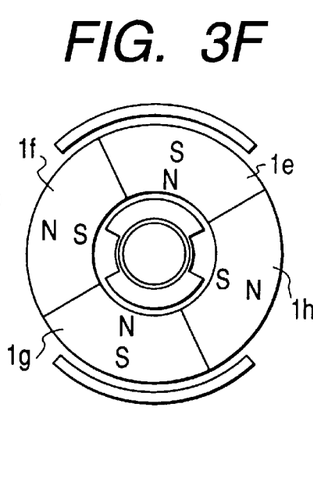

FIG. 2 is a cross-sectional view of the assembled state, FIGS. 3A, 3B, 3C, and 3D are cross-sectional views along A—A in FIG. 2, and FIGS. 3E, 3F, 3G, and 3H are cross-sectional views along B—B in FIG. 2. FIGS. 3A and 3E are cross-sectional views at a moment, FIGS. 3B and 3F those at another moment, FIGS. 3C and 3G those at still another moment, and FIGS. 3D and 3H those at yet still another moment. When from the state of FIGS. 3A and 3E the coil 3 and coil 4 are energized to excite the pole portions 5*b*, 5*c*, 5*e*, 5*f* of the first yoke 5 to the S pole, the portions 8*a*, 8*b* of the third yoke opposed to the portions 5*b*, 5*c* to the N pole, the pole portions 6*b*, 6*c*, 6*e*, 6*f* of the second yoke 6 to the S pole, and the portions 9*a*, 9*b* of the fourth yoke 9 opposed to the portions 6*b*, 6*c* to the N pole, the permanent magnet 1 rotates 45° counterclockwise so as to go into the state shown in FIGS. 3B and 3F.

Since the small-diameter portions 5*e*, 5*f* in the pole section of the first yoke 5 are more distant from the inside peripheral surface of the first magnetic layer than the portions 5*b*, 5*c*, the pole occurring in the small-diameter portions 5*e*, 5*f* little acts on the first magnetic layer and thus little affects the driving force generated. Accordingly, the first yoke 5 can function in the same manner as in the case of applicant's prior application Ser. No. 08/831,863 (filed Apr. 2, 1997) which comprises inner magnetic pole with a pair of separated magnetic teeth. The shape of the first yoke 5 forms no chip when produced by press working. Therefore, no consideration is necessary for emission of chip and the production is thus easy. Since the portions 5*b*, 5*e*, 5*c*, 5*f* are joined throughout the entire circumference, the strength is high and there is no possibility of deformation during assembly.

The above is also the case for the second yoke 6. Since the small-diameter portions 6*e*, 6*f* in the pole section of the second yoke 6 are more distant from the inside peripheral surface of the second magnetic layer than the portions 6*b*, 6*c*, the pole occurring in the small-diameter portions 6*e*, 6*f* little acts on the second magnetic layer and thus little affects the driving force generated. Accordingly, the second yoke 6 can function in the same manner as in the case of above-mentioned application Ser. No. 08/831,863. The shape of the second yoke 6 forms no chip when produced by press working. Therefore, no consideration is necessary for emission of chip and the production is thus easy. Since the portions 6*b*, 6*e*, 6*c*, 6*f* are joined throughout the entire circumference, the strength is high and there is no possibility of deformation during assembly.

Figure 3G:
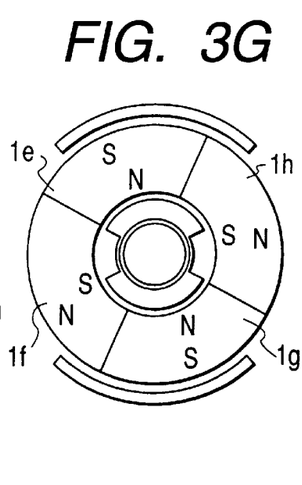

Then the power supply to the coil 3 is inverted to excite the pole portions 5*b*, 5*c*, 5*e*, 5*f* of the first yoke 5 to the N pole, the portions 8*a*, 8*b* of the third yoke opposed to the portions 5*b*, 5*c* to the S pole, the pole portions 6*b*, 6*c*, 6*e*, 6*f* of the second yoke 6 to the S pole, and the portions 9*a*, 9*b* of the fourth yoke opposed to the portions 6*b*, 6*c* to the N pole, whereupon the permanent magnet 1 is rotated further 45° counterclockwise to go into the state shown in FIGS. 3C and 3G.

Figure 3H:
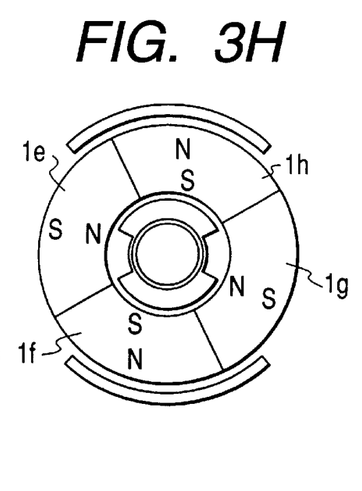

Then the power supply to the coil 4 is inverted to excite the pole portions 6*b*, 6*c*, 6*e*, 6*f* of the second yoke 6 to the N pole and the portions 9*a*, 9*b* of the fourth yoke opposed to the 6*b*, 6*c* to the S pole, whereupon the permanent magnet 1 is rotated further 45° counterclockwise. By successively switching the directions of power supply to the coil 3 and coil 4 in this manner, the rotor composed of the permanent magnet 1 and rotational shaft 2 rotates to the positions according to the phases of power supply.

Described below is the reason why the step motor of the above structure is optimum for microminiaturization of motor.

Features of the fundamental structure of the step motor are as follows.

First, the magnet is formed in the hollow cylinder shape.

Second, the outside peripheral surface of the magnet is divided circumferentially into n portions and the n portions are magnetized alternately in the different poles.

Third, the first coil, the magnet, and the second coil are located in order in the axial direction of the magnet.

Fourth, the outside pole and the inside pole of the first and second stators excited by the first and second coils are opposed to the outside peripheral surface and to the inside peripheral surface, respectively, of the magnet.

Accordingly, a necessary diameter of this step motor is a size enough to oppose the poles of the stators to the diameter of the magnet; and a necessary axial length of the step motor is the sum of the length of the magnet and the lengths of the first and second coils. Therefore, the dimensions of the step motor are determined by the diameters and lengths of the magnet and coils, and the step motor can be microminiaturized by decreasing the diameters and lengths of the magnet and coils to very small values.

When the diameters and lengths of the magnet and coils are made very small, it becomes difficult to maintain the output accuracy of the step motor. This problem of the output accuracy of the step motor is solved by the simple structure wherein the magnet is formed in the hollow cylinder shape and the outside pole and inside pole of the first and second stators are opposed to the outside peripheral surface and to the inside peripheral surface of the magnet formed in the hollow cylinder shape.

Next described is another example in which the shape of the first and second yokes is modified.

Figure 5:
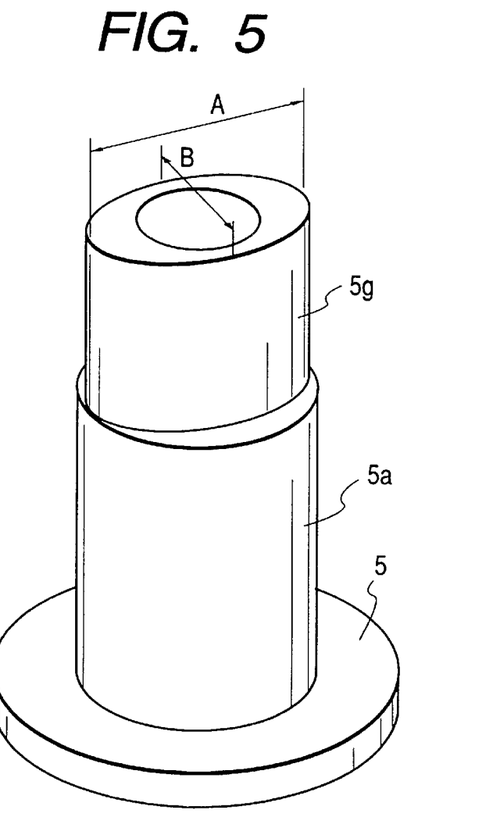
FIG. 5 is a drawing to show another example of the yoke as an inside pole in the motor shown in FIG. 2.
Figure 6:
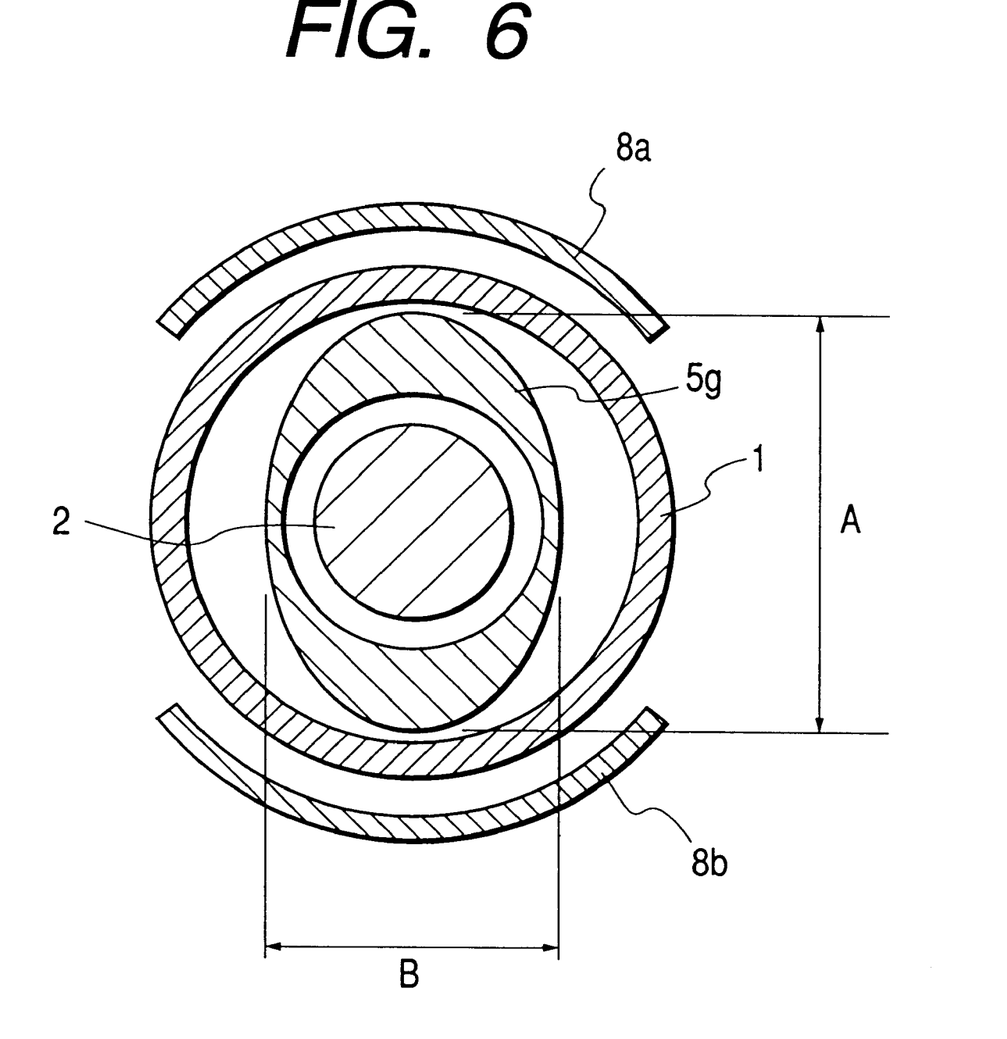
FIG. 6 is a cross-sectional view of the yoke shown in FIG. 5.

FIG. 5 and FIG. 6 are drawings to show another example of the first embodiment.

FIG. 5 is a perspective view of the first yoke, in which the pole section opposed to the inside peripheral surface of the first magnetic layer is formed in the shape of an ellipse 5g (A>B where A is the major axis and B is the minor axis) in the cross section perpendicular to the axis. FIG. 6 is a lateral, cross-sectional view of the motor in which the first yoke 5 is incorporated. The first yoke 5 is located so that the major axis A is directed toward the positions opposed to the teeth 8a, 8b of the third yoke 8. Similarly, though not illustrated, the second yoke is also formed in the elliptic shape with the major axis A and the minor axis B (A>B) at least in the outside peripheral surface of the pole section, and the major axis is arranged so as to be directed toward the positions opposed to the teeth 9a, 9b of the fourth yoke.

The outside peripheral surfaces of the first yoke 5 and second yoke 6 in the minor-axis direction are apart from the circumferential surfaces of the first magnetic layer and the second magnetic layer, respectively, and thus they do not negatively affect the output of motor, similar to the portions 5e, 5f, 6e, 6f in the first example. Since the pole section of the first yoke and second yoke is continuous throughout the entire circumference, the strength is high and no chip is produced during press working, thus achieving high workability.

In the first embodiment described above the first to fourth yokes 5, 6, 8, 9 were separate members, but they may be formed in such structure that the first and third yokes 5, 8 are integrated into a first stator yoke and that the second and fourth yokes 6, 9 are integrated into a second stator yoke.

The first magnet 1 was constructed in the double layer structure consisting of the first magnetic layer and the second magnetic layer the phases of which were shifted by 180/n degrees (n is the number of magnetic poles of the permanent magnet), i.e., 45°, but, without having to be limited to this, the present invention can also be applied to the single layer structure of a magnetic layer in the permanent magnet 1 wherein the phase of the second and fourth yokes 6, 9 is shifted by 180/n degrees, i.e., 45°, relative to that of the first and third yokes 5, 8.

The second embodiment of the present invention will be described below.

Embodiment 2

FIG. 7 to FIG. 10 are drawings to show Embodiment 2 of the present invention. In FIG. 7 to FIG. 10, reference numeral 1 designates a magnet ring of a cylindrical shape made of a permanent magnet, which is composed of a first magnetic layer having portions 1a, 1b, 1c, 1d obtained by dividing the circumference into n (4 in the present embodiment) and alternately magnetized in the S and N poles, and a second magnetic layer having portions 1e, 1f, 1g, 1h obtained similarly by dividing the circumference into 4 and alternately magnetized in the S and N poles. The phases of the first magnetic layer and the second magnetic layer are shifted by 180/n degrees, i.e., 45° from each other. In the present embodiment, the outside peripheral surfaces of the portions 1a, 1c of the first magnetic layer and the portions 1e, 1g of the second magnetic layer are magnetized in the S pole and the inside peripheral surfaces thereof in the N pole; the outside peripheral surfaces of the portions 1b, 1d of the first magnetic layer and the portions 1f, 1h of the second magnetic layer are magnetized in the N pole and the inside peripheral surfaces thereof in the S pole.

Figure 7:
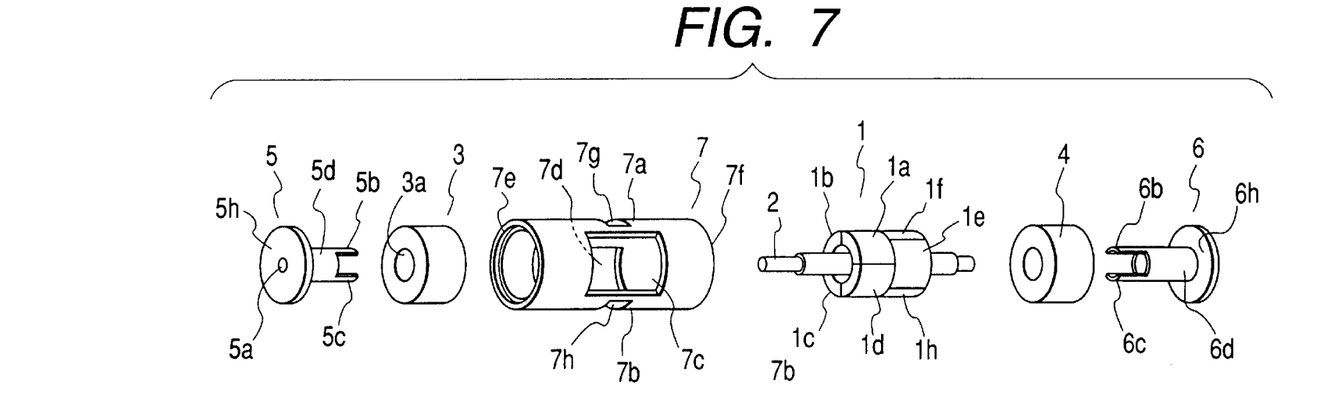
FIG. 7 is an exploded, perspective view of a motor of the second embodiment according to the present invention.

Numeral 2 denotes a rotational shaft to which the permanent magnet 1 is fixed. The rotational shaft 2 and permanent magnet 1 compose a rotor. Numerals 3, 4 are coils which are located so as to be concentric with the permanent magnet 1 and to sandwich the permanent magnet 1 in the axial direction. Numeral 5 represents a first yoke made of a soft magnetic material, which has a portion 5d set in the bore portion 3a of coil 3 and teeth 5b, 5c opposed to the bore portion of the first magnetic layer of the permanent magnet 1. The teeth 5b, 5c are formed as shifted by 360/(n/2) degrees, i.e., 180° from each other so as to be in the same phase, relative to the poles of the first magnetic layer. A portion 2a of the rotational shaft 2 is fitted in a hole 5a of the first yoke so as to be rotatable.

Numeral 6 stands for a second yoke made of a soft magnetic material, which has a portion 6d set in the bore portion 4a of coil 4, and teeth 6b, 6c opposed to the bore portion of the second magnetic layer of the permanent magnet 1. The teeth 6b, 6c are formed as shifted by 360/(n/2) degrees, i.e., 180° from each other so as to be in the same phase, relative to the poles of the second magnetic layer. A portion 2b of the rotational shaft 2 is fitted in a hole 6a of the second yoke 6 so as to be rotatable. The teeth 5b, 5c of the first yoke 5 and the teeth 6b, 6c of the second yoke 6 are located in the same phase, i.e., at positions where they are opposed to each other with respect to the axial direction.

Numeral 7 denotes a third yoke made of a soft magnetic material. The third yoke is of a barrel shape, which is constructed so as to cover the outside peripheral surfaces of the coil 3, coil 4, and permanent magnet 1. The third yoke 7 is connected at the portion 7e to the portion 5h of the first yoke 5 and at the portion 7f to the portion 6h of the second yoke 6. The third yoke 7 has portions 7a, 7b at positions opposite to the teeth 5b, 5c of the first yoke 5 and the teeth 6b, 6c of the second yoke 6 on either side of the permanent magnet 1 and holes 7c, 7d formed in the other portions than the portions 7a, 7b. Since the teeth 5b, 5c of the first yoke 5 and the teeth 6b, 6c of the second yoke 6 are in the same phase, the pole portions 7a, 7b of the third yoke 7 to be faced to those teeth have the simple shape consisting of continuous parts of the pole portions 7a, 7b as shown in FIG. 7, and the production thereof by press or the like is thus easy. In the pole teeth 7a, 7b forming the continuous parts of the third yoke 7, holes 7g, 7h are formed at positions opposite to each other near the border between the first magnetic layer and the second magnetic layer of the magnet ring 1.

This makes the reluctance high near the third yoke 7, so that the magnetic flux generated from the coil 3 becomes reluctant to act on the coil 4, the second magnetic layer of the magnet ring 1, the second yoke 6, and so on and so that the magnetic flux generated from the coil 4 becomes reluctant to act on the coil 3, the first magnetic layer of the magnet ring 1, the first yoke 5, and so on. Thus, the rotor becomes smoothly rotatable according to the operation described below, thereby increasing the output of motor.

Figure 8:
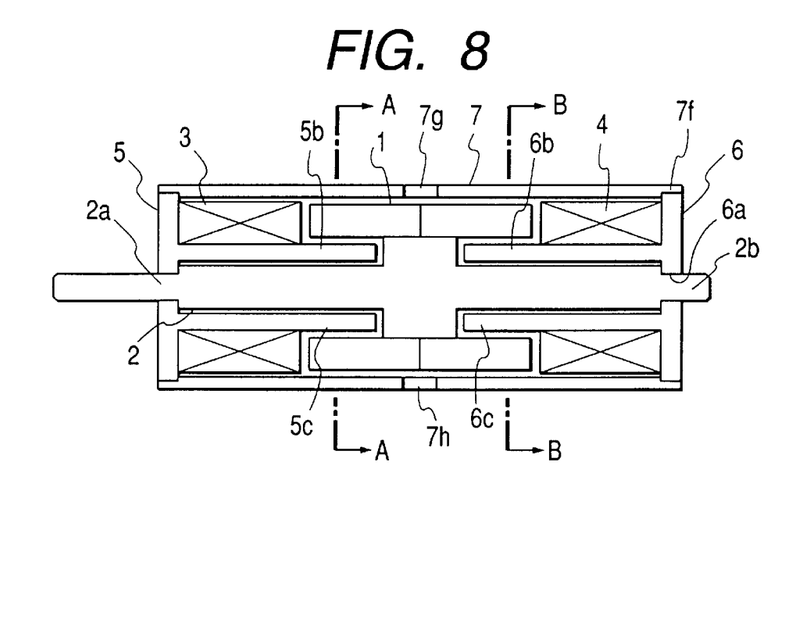
FIG. 8 is a cross-sectional view of the assembled state of the motor shown in FIG. 7.
Figure 9A:
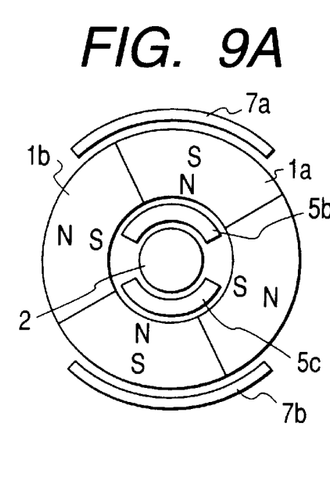
FIGS. 9A, 9B, 9C, 9D, 9E, 9F, 9G, and 9H are drawings for explaining the rotor rotation operation of the motor shown in FIG. 7.
Figure 9B:
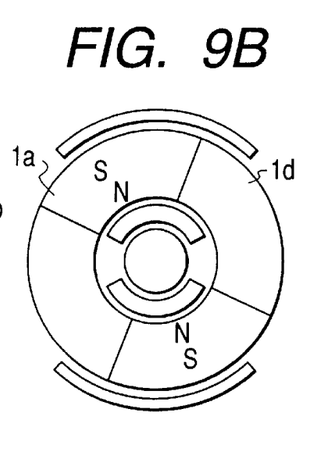
Figure 9C:
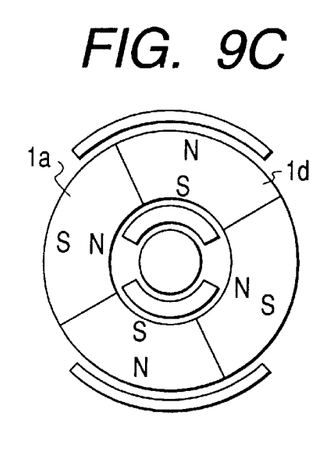
Figure 9D:
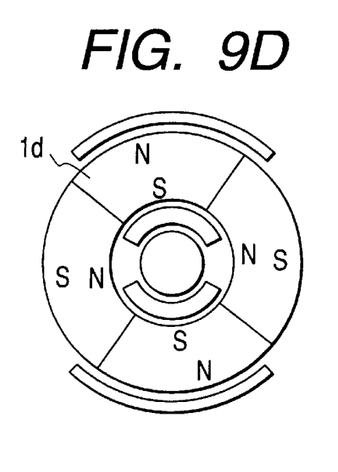
Figure 9E:
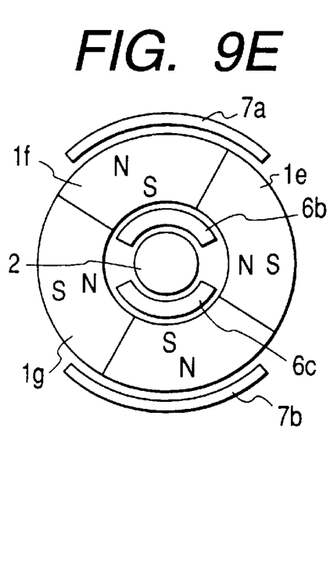

FIG. 8 is a cross-sectional view of the assembled state, FIGS. 9A, 9B, 9C, and 9D are cross-sectional views along A—A in FIG. 8, and FIGS. 9E, 9F, 9G, and 9H are cross-sectional views along B—B in FIG. 8. FIGS. 9A and 9E are cross-sectional views at a moment, FIGS. 9B and 9F those at another moment, FIGS. 9C and 9G those at still another moment, and FIGS. 9D and 9H those at yet still another moment.

Figure 9F:
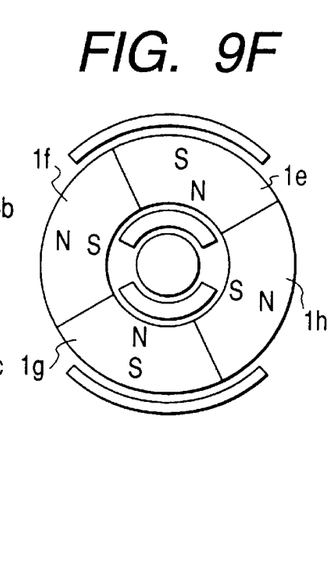

When from the state of FIGS. 9A and 9E the coil 3 and coil 4 are energized to excite the teeth 5b, 5c of the first yoke 5 to the S pole, the portions 7a, 7b of the third yoke 7 opposed to the teeth 5b, 5c to the N pole, the teeth 6b, 6c of the second yoke 6 to the S pole, and the portions 7a, 7b of the third yoke 7 opposed to the teeth 6b, 6c to the N pole, the magnet ring 1 is rotated 45° leftward (counterclockwise) to go into the state shown in FIGS. 9B and 9F.

Figure 9G:
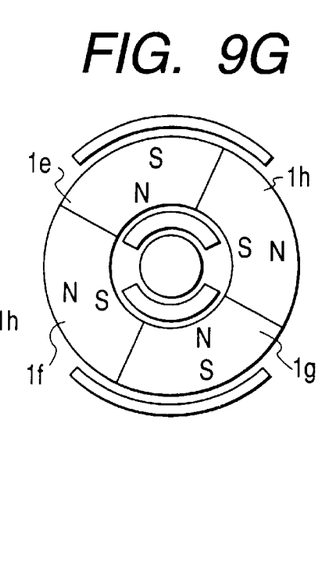
Figure 9H:
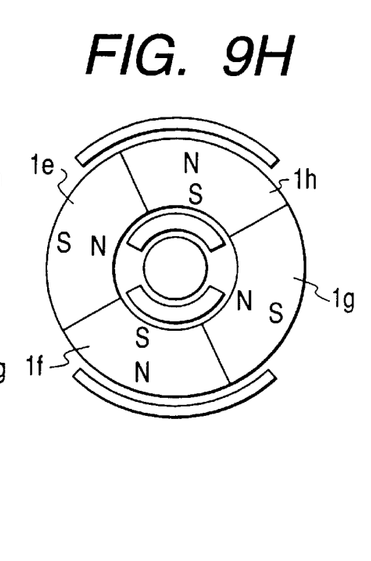

Then the power supply to the coil 3 is inverted to excite the teeth 5b, 5c of the first yoke 5 to the N pole, the portions 7a, 7b of the third yoke 7 opposed to the teeth 5b, 5c to the S pole, the teeth 6b, 6c of the second yoke 6 to the S pole, and the portions 7a, 7b of the third yoke 7 opposed to the teeth 6b, 6c to the N pole, whereupon the magnet ring 1 is rotated further 45° counterclockwise to go into the state shown in FIGS. 9C and 9G.

Figure 10:
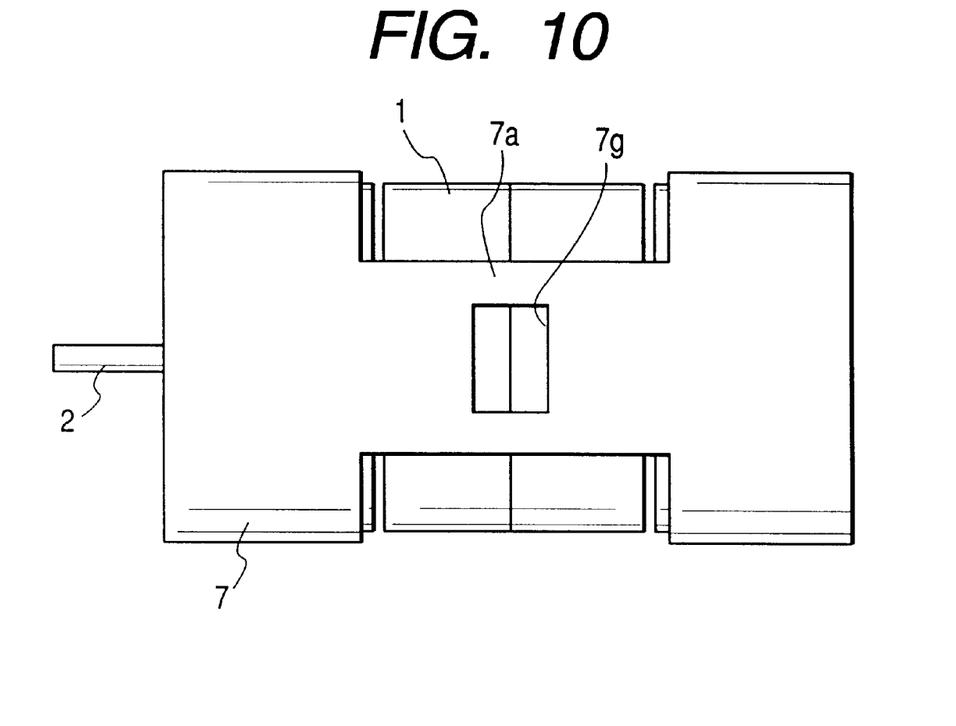
FIG. 10 is a plan view of the motor shown in FIG. 7.

Then the power supply to the coil 4 is inverted to excite the teeth 6b, 6c of the second yoke 6 to the N pole and the portions 7a, 7b of the third yoke 7 opposed to the teeth 6b, 6c to the S pole, whereupon the permanent magnet 1 is rotated further 45° counterclockwise. By successively switching the directions of power supply to the coil 3 and coil 4 in this way, the rotor comprised of the magnet ring 1 and rotational shaft 2 rotates to the positions according to the phases of power supply. FIG. 10 is a top plan view of this motor.

Next described is another example in which the shape of the third yoke is modified.

Figure 11:
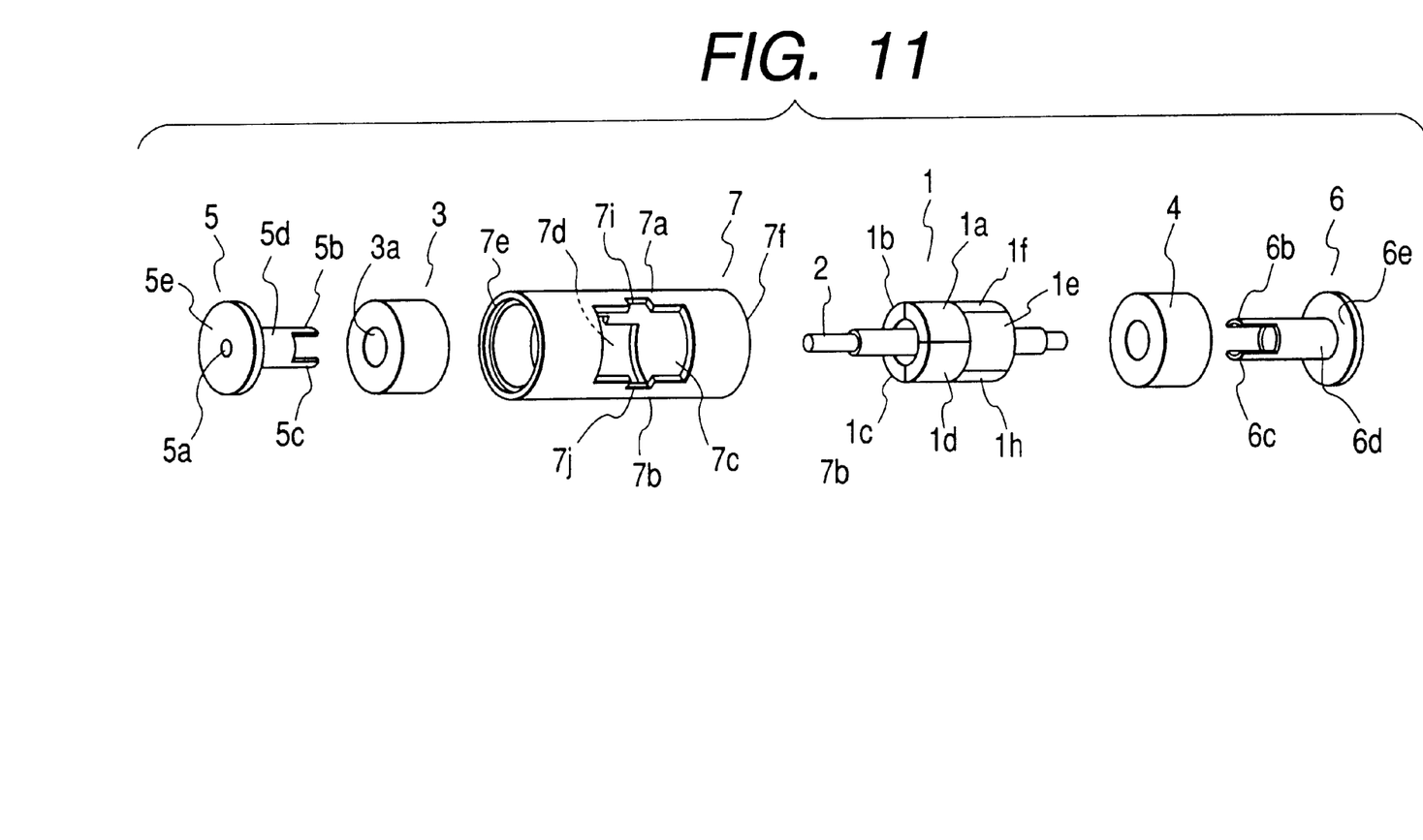
FIG. 11 is an exploded, perspective view to show another example of the motor shown in FIG. 7.
Figure 12:
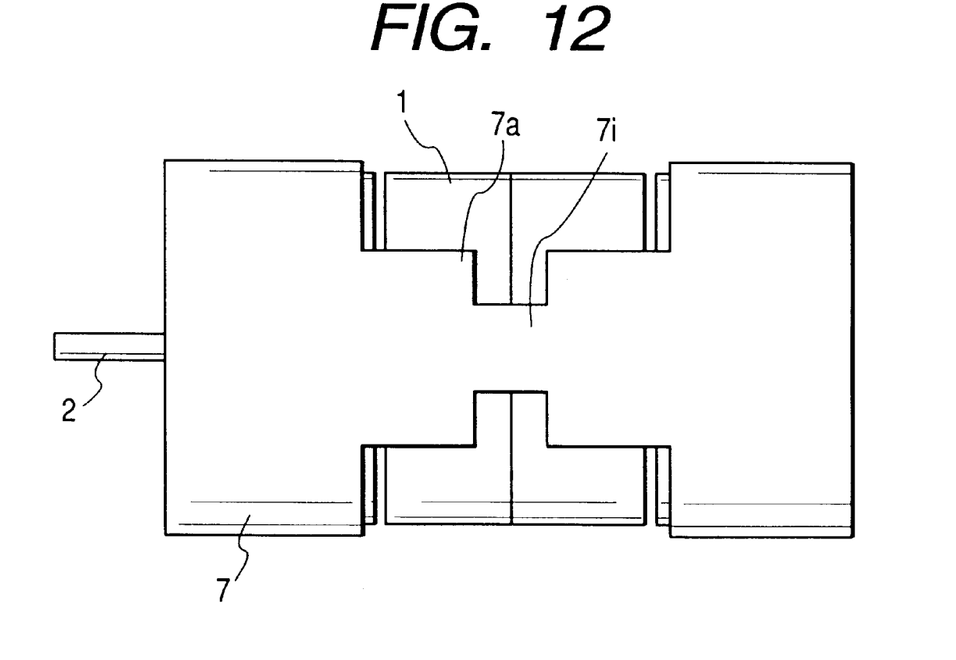
FIG. 12 is a plan view of the assembled state of the motor shown in FIG. 11.

FIG. 11 and FIG. 12 are drawings to show another example of the second embodiment.

In FIG. 11 and FIG. 12, numeral 1 designates a magnet ring of a cylindrical shape made from a permanent magnet, which is composed of a first magnetic layer having portions 1a, 1b, 1c, 1d obtained by dividing the circumference into n (4 in this example) and alternately magnetized in the S and N poles, and a second magnetic layer having portions 1e, 1f, 1g, 1h obtained similarly by dividing the circumference into 4 and alternately magnetized in the S and N poles. The phases of the first magnetic layer and second magnetic layer are shifted by 180/n degrees, i.e., 45° from each other. In the present example, the outside peripheral surfaces of the portions 1a, 1c of the first magnetic layer and the portions 1e, 1g of the second magnetic layer are magnetized in the S pole and the inside peripheral surfaces thereof in the N pole; the outside peripheral surfaces of the portions 1b, 1d of the first magnetic layer and the portions 1f, 1h of the second magnetic layer are magnetized in the N pole and the inside peripheral surfaces thereof in the S pole.

Numeral 2 represents a rotational shaft to which the permanent magnet 1 is fixed. The rotational shaft 2 and permanent magnet 1 compose the claimed rotor. Numerals 3, 4 are coils which are located so as to be concentric with the permanent magnet 1 and to sandwich the permanent magnet 1 in the axial direction. Numeral 5 designates a first yoke made of a soft magnetic material, which has a portion 5d set in the bore portion 3a of the coil 3 and teeth 5b, 5c opposed to the bore portion of the first magnetic layer of the permanent magnet 1. The teeth 5b, 5c are formed as shifted by 360/(n/2) degrees, i.e., 180° from each other so as to be in the same phase, relative to the poles of the first magnetic layer, and a portion 2a of the rotational shaft 2 is fitted in a hole 5a of the first yoke so as to be rotatable.

Numeral 6 denotes a second yoke made of a soft magnetic material, which has a portion 6d set in the bore portion 4a of coil 4 and teeth 6b, 6c opposed to the bore portion of the second magnetic layer of the permanent magnet 1. The teeth 6b, 6c are formed as shifted by 360/(n/2) degrees, i.e., 180° from each other so as to be in the same phase, relative to the poles of the second magnetic layer. A portion 2b of the rotational shaft 2 is fitted in a hole 6a of the second yoke 6 so as to be rotatable. The teeth 5b, 5c of the first yoke 5 and the teeth 6b, 6c of the second yoke 6 are located in the same phase, i.e., at positions opposite to each other with respect to the axial direction.

Numeral 7 stands for a third yoke made of a soft magnetic material. The third yoke is formed in a barrel shape so as to cover the outside peripheral surfaces of the coil 3, coil 4, and permanent magnet 1. The third yoke 7 is connected at the portion 7e to the portion 5e of the first yoke 5 and at the portion 7f to the portion 6e of the second yoke 6. The third yoke 7 has portions 7a, 7b at the positions opposite to the teeth 5b, 5c of the first yoke 5 and to the teeth 6b, 6c of the second yoke 6 on either side of the permanent magnet 1, and holes 7c, 7d are formed in the portions other than the portions 7a, 7b. The teeth 5b, 5c of the first yoke 5 and the teeth 6b, 6c of the second yoke 6 are in the same phase, and the pole portions 7a, 7b of the third yoke 7 to be opposed to those teeth are of the simple shape of continuous parts of the magnetic portions as shown in FIG. 11. The production thereof by press or the like is thus easy. In the pole teeth 7a, 7b forming the continuous parts of the third yoke 7, notch portions 7i, 7j with a narrower width than that at the other positions are formed at positions opposite near the border between the first magnetic layer and the second magnetic layer of the magnet ring 1.

This makes the reluctance high near the third yoke 7, so that the magnetic flux generated from the coil 3 becomes reluctant to act on the coil 4, the second magnetic layer of the magnet ring 1, the second yoke 6, and so on and so that the magnetic flux generated from the coil 4 becomes reluctant to act on the coil 3, the first magnetic layer of the magnet ring 1, the first yoke 5, and so on. Thus, the rotor becomes smoothly rotatable according to the operation already described in the first embodiment, thereby increasing the output of motor.

As described above, the present invention can provide the cheap motors, because the yokes are formed in the shape with good workability and with high strength. The present invention can also provide the high-output motor that can be produced readily, that has a small diameter, and that rotates on a smooth basis.

In the above embodiments, the permanent magnet forming the rotor was one obtained by dividing the outside peripheral surface circumferentially into n and magnetizing the n portions in the S and N poles and by also dividing the inside peripheral surface circumferentially into n and magnetizing the n portions in the S and N poles so that the inside peripheral surface was magnetized in the poles different from those of the adjacent outside peripheral surface. The present invention, however, is not limited to this, but the permanent magnet may be one obtained by dividing only the outside peripheral surface circumferentially into n and magnetizing the n portions in the S and N poles.

In the above embodiments the number of poles of the permanent magnet was 4, but, without having to be limited to this, the present invention may be applied to the cases wherein the number of poles of the permanent magnet is not less than 4. In the case wherein the number of poles of the permanent magnet is not less than 4, the number of the outside and inside poles is also increased according thereto.

What is claimed is:

1. A motor comprising:
    a magnet formed in a cylindrical shape, said magnet being magnetized so that at least an outside peripheral surface thereof is divided circumferentially into n portions and said n portions are magnetized in alternately different poles;
    a first coil and a second coil disposed in an axial direction of said magnet, said first coil and said second coil being located on either side of said magnet;
    a first outside pole excited by said first coil, said first outside pole being opposed to the outside peripheral surface of said magnet on a side of one end thereof;
    a first inside pole excited by said first coil, said first inside pole being formed as a first yoke opposed to an inside peripheral surface of said magnet on the side of the one end thereof, said first yoke having such a shape that a cross section thereof in a direction perpendicular to a axis of said magnet comprises alternately formed regions with a large outside dimension and with a small outside dimension;
    a second outside pole excited by said second coil, said second outside pole being opposed to the outside peripheral surface of said magnet on a side of another end thereof; and
    a second inside pole excited by said second coil, said second inside pole being formed as a second yoke opposed to the inside peripheral surface of said magnet on the side of the other end thereof, said second yoke having such a shape that a cross section thereof in a direction perpendicular to the axis of said magnet comprises alternately formed regions with a large outside dimension and with a small outside dimension.

2. A motor according to claim 1, wherein said magnet is magnetized so that the inside peripheral surface thereof is also divided circumferentially into said n portions and said n portions are magnetized in alternately different poles that are also different from those in the outside peripheral surface adjacent thereto.

3. A motor according to claim 1, wherein said first outside pole is formed as a third yoke, said second outside pole is formed as a fourth yoke, said first yoke and said third yoke form a first stator, and said second yoke and said fourth yoke form a second stator.

4. A motor according to claim 3, wherein said third yoke and said fourth yoke are connected by a connecting member of a cylindrical shape.

5. A motor according to claim 3, wherein said first yoke or/and said second yoke are formed so that said cross-sectional shape thereof in the direction perpendicular to the axis of said magnet is an elliptic shape with a major axis A and a minor axis B (A>B), wherein the major axis A is arranged so as to be located opposite to the poles of the third yoke and the fourth yoke.

6. A motor comprising:
    a magnet formed in a cylindrical shape, said magnet being magnetized so that at least an outside peripheral surface thereof is divided circumferentially into n portions and said n portions are magnetized in alternately different poles;
    a first coil and a second coil disposed in an axial direction of said magnet, said first coil and said second coil being located on either side of said magnet;
    a first outside pole excited by said first coil, said first outside pole being opposed to an outside peripheral surface of said magnet on a side of one end thereof;
    a first inside pole excited by said first coil, said first inside pole being formed as a first yoke opposed to an inside peripheral surface of said magnet on the side of the one end thereof, said first yoke having such a shape that a cross section thereof in a direction perpendicular to an axis of said magnet comprises alternately formed regions with a large outside dimension and with a small outside dimension;
    a second inside pole excited by said second coil, said second inside pole being formed as a second yoke opposed to the inside peripheral surface of said magnet on the side of the other end thereof, said second yoke having such a shape that a cross section thereof in the direction perpendicular to the axis of said magnet comprises alternately formed regions with a large outside dimension and with a small outside dimension; and
    a second outside pole excited by said second coil, said second outside pole being opposed to the outside peripheral surface of said magnet on the side of the other end thereof, said second outside pole and said first outside pole forming a third yoke, said third yoke being formed in a barrel shape having a hole portion and a continuous portion forming pole portions of the first and second outside poles, wherein a further hole portion is also provided substantially in a center of the continuous portion.

7. A motor according to claim 6, wherein said magnet has a first magnetic layer in which at least an outside peripheral surface thereof is also divided circumferentially into said n portions and said n portions are magnetized in alternately different poles, and a second magnetic layer in which at least an outside peripheral surface thereof is divided circumferentially into said n portions and said n portions are magnetized in alternately different poles, said second magnetic layer being formed in a phase shifted by 180/n degrees from that of the first magnetic layer and at a position adjacent thereto in the axial direction.

8. A motor according to claim 7, wherein said magnet is magnetized so that the inside peripheral surface thereof is divided circumferentially into said n portions and said n portions are magnetized in alternately different poles that are also different from those in the outside peripheral surface adjacent thereto.

9. A motor comprising:

a magnet formed in a cylindrical shape, said magnet being magnetized so that at least an outside peripheral surface thereof is divided circumferentially into n portions and said n portions are magnetized in alternately different poles;

a first coil and a second coil disposed in an axial direction of said magnet, said first coil and said second coil being located on either side of said magnet;

a first outside pole excited by said first coil, said first outside pole being opposed to the outside peripheral surface of said magnet on the side of one end thereof;

a first inside pole excited by said first coil, said first inside pole being formed as a first yoke opposed to an inside peripheral surface of said magnet on the side of the one end thereof, said first yoke having such a shape that a cross section thereof in a direction perpendicular to the axis of said magnet comprises alternately formed regions with a large outside dimension and with a small outside dimension;

a second inside pole excited by said second coil, said second inside pole being formed as a second yoke opposed to the inside peripheral surface of said magnet on the side of the other end thereof, said second yoke having such a shape that a cross section thereof in the direction perpendicular to the axis of said magnet comprises alternately formed regions with a large outside dimension and with a small outside dimension; and a second outside pole excited by said second coil, said second outside pole being opposed to the outside peripheral surface of said magnet on the side of the other end thereof, said second outside pole and said first outside pole forming a third yoke, said third yoke being formed in a barrel shape having a hole portion and a continuous portion forming pole portions of the first and second outside poles, wherein a notch portion continuous from said hole portion is provided substantially in a center of the continuous portion.

10. A motor according to claim 9, wherein said magnet has a first magnetic layer in which at least an outside peripheral surface thereof is also divided circumferentially into said n portions and said n portions are magnetized in alternately different poles, and a second magnetic layer in which at least an outside peripheral surface thereof is divided circumferentially into said n portions and said n portions are magnetized in alternately different poles, said second magnetic layer being formed in a phase shifted by 180/n degrees from that of the first magnetic layer and at a position adjacent thereto in the axial direction.

11. A motor according to claim 9, wherein said magnet is magnetized so that the inside peripheral surface thereof is divided circumferentially into said n portions and said n portions are magnetized in alternately different poles that are also different from those in the outside peripheral surface adjacent thereto.

12. A motor comprising:

a magnet formed in a cylindrical shape, said magnet having a first magnetic layer in which at least an outside peripheral surface thereof is divided circumferentially into n portions and said n portions are magnetized in alternately different poles, and a second magnetic layer in which at least an outside peripheral surface thereof is divided circumferentially into said n portions and said n portions are magnetized in alternately different poles, said second magnetic layer being located at a position adjacent to said first magnetic layer in an axial direction and having a phase shifted by 180/n degrees from that of the first magnetic layer;

a first coil and a second coil disposed in the axial direction of said magnet, said first coil and said second coil being located on either side of said magnet;

a first yoke of a barrel shape set inside of said first coil and opposed with a gap to an inside face of the first magnetic layer of said magnet, said first yoke forming a pole section in which a cross section thereof in a direction perpendicular to the axis of said magnet comprises alternately formed regions with a large outside dimension and with a small outside dimension;

a second yoke of a barrel shape set inside of said second coil and opposed with a gap to an inside face of the second magnetic layer of said magnet, said second yoke forming a pole section in which a cross section thereof in the direction perpendicular to the axis of said magnet comprises alternately formed regions with a large outside dimension and with a small outside dimension;

a third yoke comprising one end connected to said first yoke and covering an outside face of said first coil and another end having a pole portion opposed to the outside peripheral surface of the first magnetic layer of said magnet;

a fourth yoke comprising one end connected to said second yoke and covering an outside face of said second coil and another end having a pole portion opposed to the outside peripheral surface of the second magnetic layer of said magnet; and a connecting member for holding said third yoke and said fourth yoke concentric with each other.

* * * * *

UNITED STATES PATENT AND TRADEMARK OFFICE
CERTIFICATE OF CORRECTION

PATENT NO. : 5,925,945
DATED : July 20, 1999
INVENTOR(S) : CHIKARA AOSHIMA

Page 1 of 2

It is certified that error appears in the above-identified patent and that said Letters Patent is hereby corrected as shown below:

Title page, item

[56], FOREIGN APPLICATION PRIORITY DATA

"62-141955 5/1987 Japan." should be deleted.

"7256145 4/1997 Japan.
8098881 11/1997 Japan." should read

--9-7256145 4/1997 Japan.
9-8098881 11/1997 Japan.--; and

"2-228241 11/1990 Japan." should be deleted.

COLUMN 10

Line 63, "is" should read --is also--.

COLUMN 11

Line 17, "the" should read --an--.
Line 24, "the" (1st occurrence) should read --a--; and
        "the other" should read --another--.
Line 45, "is" should read --is also--.
Line 52, "is" should read --is also--.

UNITED STATES PATENT AND TRADEMARK OFFICE
CERTIFICATE OF CORRECTION

PATENT NO. : 5,925,945

DATED : July 20, 1999

INVENTOR(S) : CHIKARA AOSHIMA

It is certified that error appears in the above-identified patent and that said Letters Patent is hereby corrected as shown below:

<u>COLUMN 12</u>

Line 12, "is" should read --is also--.

Signed and Sealed this

Fifteenth Day of February, 2000

Attest:

Q. TODD DICKINSON

*Attesting Officer*      *Commissioner of Patents and Trademarks*